INVENTOR.
MILFORD B. MOORE
BY Carroll R. Taber

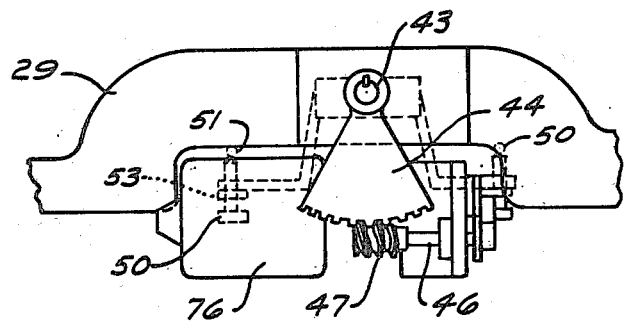
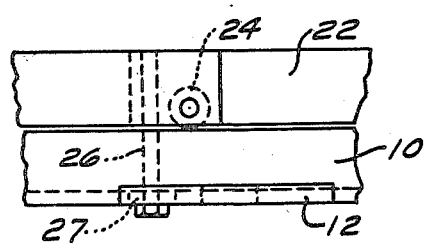
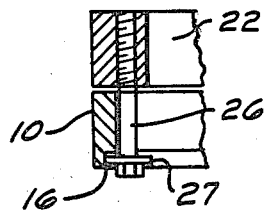
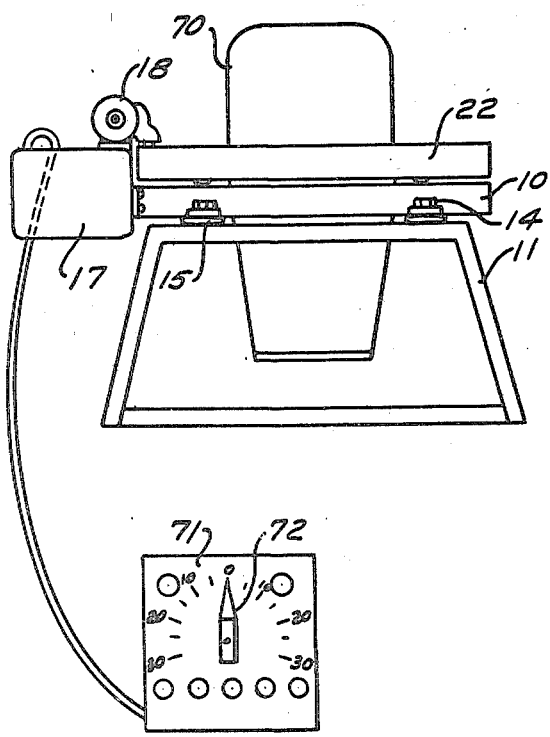
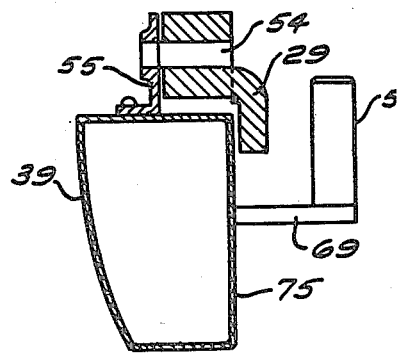

Patented July 27, 1948

2,446,096

UNITED STATES PATENT OFFICE 2,446,096

AUTOMATIC LEVELER

Milford B. Moore, Lansing, Mich., assignor to Talbert Abrams, doing business as Abrams Instrument Company, Lansing, Mich.

Application September 15, 1941, Serial No. 410,821

9 Claims. (Cl. 318—19)

This invention relates to the combination with an aerial camera mount, or the like, of means for automatically maintaining the inner member thereof in a predetermined position in relation to the horizontal.

It will be readily apparent to those skilled in the art that the present invention is not limited to use with aerial camera mounts, but on the contrary, may be employed for automatically maintaining any movable member in a predetermined position about any axis other than a truly vertical axis. Nevertheless, for the sake of clarity and brevity, the invention is shown and described as applied to an aerial camera mount. Therefore, reference should be had to the appended claims to ascertain the full scope of the invention.

Aerial camera mounts are conventionally in the form of a gimbal or Cardan ring, suitably supported and otherwise constructed and arranged so that the camera supported thereby may be "crabbed" or rotated about a vertical axis and pivoted about two horizontal axes arranged at right angles to each other. One of said axes extends longitudinally of the airplane, and that axis is known as the "roll" axis. The other axis extends transversely of the airplane and is known as the "pitch" axis.

From the foregoing it will be apparent that within certain limitations the focal axis of the camera lens may be arranged perpendicular to the earth, irrespective of the position of the airplane with respect to its direction of travel, roll or pitch.

Heretofore it has been the common practice to adjust the camera to the desired position by manual operation, as by means of cranks or the like, associated with the different axes about which the camera is rotated or pivoted.

The principal object of the present invention, as applied to aerial camera mounts, is to provide means for automatically levelling the camera so as to reduce the duties of the camera operator. The other objects and the outstanding advantages of the present invention can best be made clear by describing in a general way the manner in which the invention is applied to an aerial camera mount of the character indicated above.

As previously mentioned, aerial camera mounts are conventionally in the form of a gimbal, which includes a crab ring mounted for rotation about a vertical axis, an outer frame member disposed within the crab ring and mounted thereon for rotation about a horizontal axis, and an inner frame member disposed within the outer frame member and mounted thereon for rotation about a horizontal axis arranged at right angles to the axis of the outer frame member. In the present embodiment the outer frame member is mounted upon the "pitch" axis and the inner frame member is mounted upon the "roll" axis. The camera is supported upon the inner frame member.

There is associated with the crab ring a reversible motor operated by the camera operator from a control panel, by means of electrical controls, to rotate the crab ring in either direction. This crab control mechanism by itself forms no part of the present invention.

There is mounted upon the crab ring and associated with the outer frame member a reversible electric motor adapted to rotate the outer frame member in either direction about the "pitch" axis. There is mounted on the outer frame member and associated with the inner frame member a reversible motor adapted to rotate the inner frame member in either direction about the "roll" axis. Control mechanism is provided for the "roll" and "pitch" motors which includes means mounted on the inner frame member which energizes one or the other or both of the motors whenever the inner frame member assumes a position other than a predetermined position with reference to the horizontal. The camera is so mounted on the inner frame member that when the inner frame member is horizontal relative to the earth, the focal axis of the camera lens is perpendicular to the earth.

According to the present invention, the means for energizing the "roll" and "pitch" motors comprises a plurality of photoelectric assemblies mounted upon the inner frame member. There are two assemblies for each motor, one assembly being adapted to energize the motor to operate in one direction, and the other assembly to energize the motor to operate in the other direction.

Each photoelectric assembly includes a photoelectric element, which may be a phototube or other device for creating an electric current when exposed to light, an exciter lamp arranged to direct a beam of light at the photoelectric element, and a level tube interposed between the exciter lamp and the photoelectric element. The fluid in the level tube, or the bubble, as may be desired, are arranged to interrupt or divert the beam of light from the photoelectric element. Each photoelectric element is arranged in the motor circuit so that the motor is energized either when the beam of light hits the photoelectric element or vice versa, as desired.

The two photoelectric assemblies which control the "pitch" motor are arranged upon the inner frame so that the level tubes extend at right angles to the "pitch" axis. Thus, whenever the inner frame member assumes a position about the "pitch" axis other than the predetermined position in relation to the horizontal, the level tubes through their relation with the photo electric assemblies serve to actuate the "pitch" motor to rotate the outer frame member about the "pitch" axis in the required direction to bring the inner frame back to the desired predetermined position.

The photoelectric assemblies which are associated with the "roll" motor are mounted on the inner frame member so that the level tubes forming a part thereof extend at right angles to the "roll" axis. Thus, whenever the inner frame member assumes a position about the roll axis other than the desired predetermined horizontal position, the level tubes through the assembly with which they are associated actuate the "roll" motor to rotate the inner frame member in the required direction to bring it back to the desired predetermined horizontal position.

The construction and arrangement of the mount, the details of the photoelectric assemblies, and the manner in which they are associated with the motor circuits to energize the "pitch" and "roll" motors, will be described in detail hereinafter. However, from the arrangement of these parts briefly described above, it will be apparent that within certain predetermined limits they provide means for automatically maintaining the inner frame of the camera mount in a predetermined position with relation to the horizontal, and thereby maintain the focal axis of the camera lens perpendicular to the horizontal.

For a more detailed description of the invention, as applied to an aerial camera mount, reference should now be had to the following detailed description, which is to be read in connection with the accompanying drawings, wherein:

Figure 2 is a fragmentary elevational view taken on substantially the line 2—2 of Figure 1;

Figure 3 is a fragmentary elevational view taken on substantially the line 3—3 of Figure 1;

Figure 4 is a fragmentary cross-sectional view taken on substantially the line 4—4 of Figure 1;

Figure 5 is a fragmentary cross-sectional view taken on substantially the line 5—5 of Figure 1;

Figure 6 is a side elevational view of the device shown in Figure 1, showing a camera mounted thereon.

Figure 1:
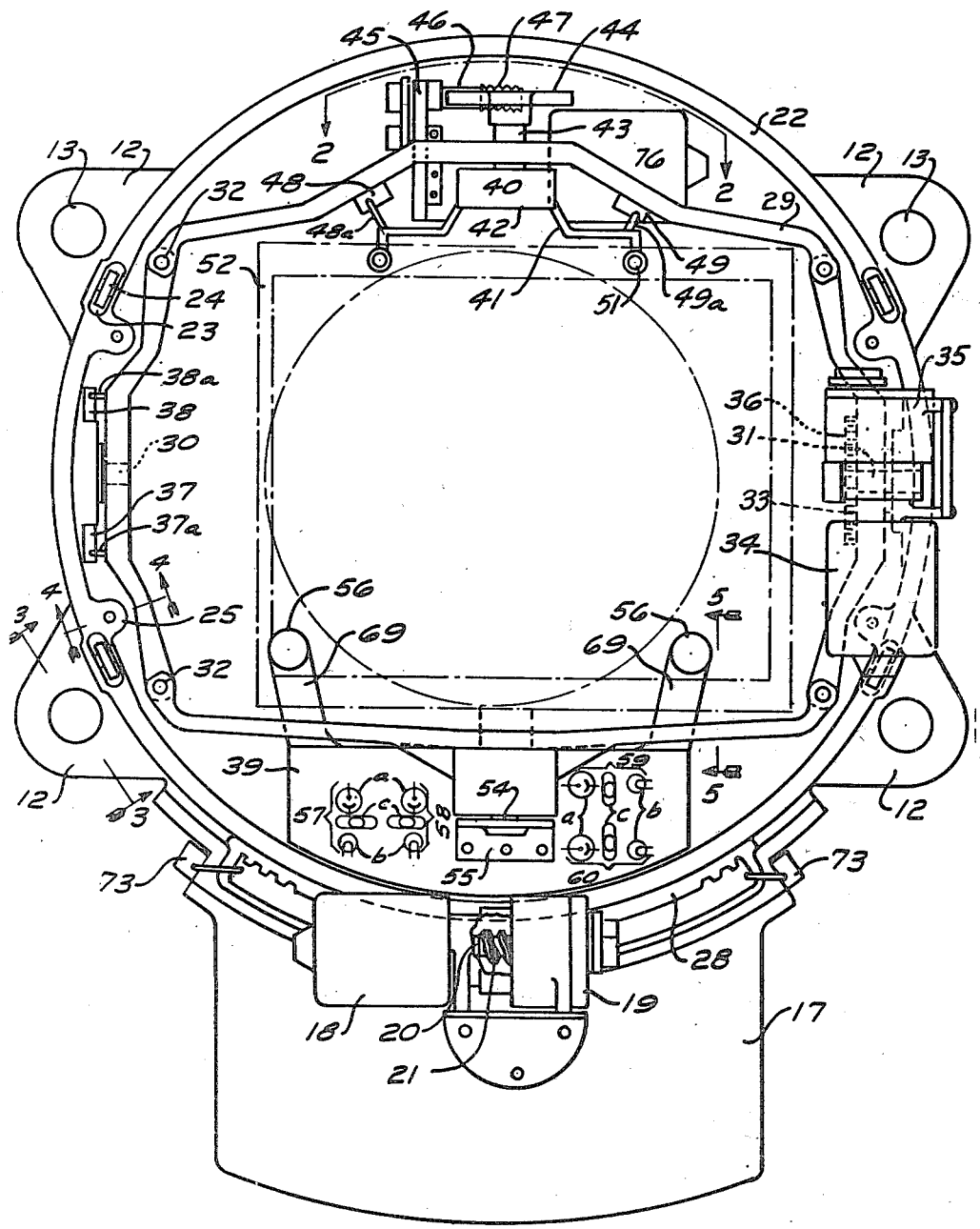
Figure 1 is a plan view of a camera mount embodying the invention.

Referring now more specifically to the drawings, the camera mount comprises a lower crab ring 10 which is resiliently mounted on a suitable base 11, and an upper crab ring 22 rotatably mounted on the lower crab ring on a vertical axis. See Figure 6. The lower crab ring is an annulus having four radially projecting lugs 12 with openings 13 therein. The lugs 12 are bolted to the base 11 by bolts 14 which pass through the openings 13. Suitable resilient means, such as rubber rings 15, are interposed between the lugs 12 and the base 11. As will be noted from Figures 3 and 4, the lower crab ring 10 has an annular rabbet 16 at its lower inner edge for a purpose which will appear presently.

Rigidly attached to the lower crab ring 10 is a housing 17, Figures 1 and 6, called a converter box, which houses a portion of the controls to be described more fully hereinafter. Mounted on top of the converter box 17 at the side adjacent the crab ring is a reversible electric motor 18. Aligned with the shaft of the motor 18 is a gear box 19 containing reduction gears which are operatively connected to the shaft of the motor 18. A shaft 20 projects from the gear box and carries a worm 21. The purpose of the worm 21 will appear more fully presently.

An upper crab ring 22, which has the same diameter as the lower crab ring, is rotatably mounted upon the lower crab ring 10. The upper crab ring 22 has a plurality of vertically extending elongated slots 23 in which rollers 24 are journaled. Rollers 24 project slightly below the lower surface of the upper crab ring and rest upon the upper surface of the lower crab ring whereby the upper crab ring may roll upon the lower crab ring. The upper crab ring 22 is provided with four inwardly projecting ears 25 into which bolts 26 (see Figures 3 and 4) are threaded. Revolubly mounted on the lower ends of the bolts 26 are rollers 27 which turn about a vertical axis and contact the lower crab ring in the rabbet 16. The bolts 26 and rollers 27 constitute the means for holding the two crab rings together while permitting relative rotary movement thereof.

At one side of the upper crab ring 22 (see Figure 1) is a segment of a ring gear 28. The segment 28 is rigidly attached to the upper crab ring and is arranged to mesh with the worm gear 21. The upper crab ring 22 may be turned either clockwise or counter-clockwise by means of the reversible motor 18.

The motor 18 is connected to a remote control box 71 which is preferably mounted on the control panel of the plane, so that it is under the control of the pilot or the observer. The control box 71 contains a multiple contact stepping switch, so that by actuation of a knob 72, which is connected to the stepping switch, the motor 18 can be operated. By turning the knob 72 one way or the other the motor can be driven in the proper direction to rotate the upper crab ring 32 about its vertical axis. A pair of limit switches 73 adjacent the ends of the gear sector 28 prevent the upper crab ring from turning beyond any desired point in either direction.

The means for leveling a camera on the crab ring 22 will now be described. It comprises an outer frame member 29 pivotally mounted on a horizontal axis upon the upper crab ring 22 by means of stub shafts 30 and 31. The axis of the shafts 30 and 31 is called the "pitch" axis. Preferably the shafts 30 and 31 are rigidly attached to the outer frame 29 and are journaled in suitable bearings in the crab ring 22.

The frame 29 preferably is made up of four pieces joined together at the corners by removable bolts 32.

Pivotally mounted on the outer frame 29 on an axis perpendicular to the aforementioned "pitch" axis is an inner frame assembly. The inner frame assembly consists of two cradles 39 and 40 and a camera frame 52. The cradles 39 and 40 and the camera frame are tied together, as will appear more fully hereinafter, and pivot as a unit about the aforementioned axis, which is known as the "roll" axis.

The cradle 40 comprises a pair of arms 41 projecting from a center block 42. The block 42 carries a stub shaft 43 to which it is rigidly attached. The stub shaft is journaled in a bearing on the outer frame 29.

Threaded into the ends of the arms 41 are adjustable studs 50. The upper ends of the studs are ball shaped, as at 51, and are adapted to carry one side of the camera frame, shown in broken lines in Figure 1 and designated by the numeral 52. A lock nut 53 is provided on each stud 50 for locking the latter in its adjusted position. The studs are adjusted by turning them on the arms 41 and thereby moving them up or down.

The cradle 39 is pivotally mounted on the side of the outer frame opposite the cradle 40 by means of a shaft 54 journaled in a bracket 55 riveted to the cradle 39. Shaft 54 is axially aligned with shaft 43. The cradle 39 comprises a metal housing 75, shown in cross section in Figure 5, and ordinarily called a control box. Projecting laterally from the ends of the control box are a pair of supports 69. The supports 69 have vertical posts 56 rigidly attached thereto which support the adjacent side of the camera frame 52. When the camera is in place on cradles 39 and 40, the two are tied together so that they may pivot about their common axis which is defined by the shafts 43 and 54.

It will be noted from the foregoing, and an inspection of Figures 1 and 5, that the control box is outside of the outer frame 29, and that the posts 56 are inside said frame. Thus, plenty of clearance between the projections 69 and the frame 29 is provided to permit the two parts to rotate relative to each other.

A camera 70 is carried by the frame 52 above mentioned. One side of the frame is carried on the upper ends of the posts 56 and the other side of the frame is mounted on the ball shaped ends 51 of the studs 50. The above described adjustment of the studs 50 is to permit leveling of the camera relative to the cradle 39 about both of its horizontal axes.

The mechanism for rotating the inner frame about the "roll" axis comprises a gear sector 44 keyed to the end of the shaft 43 and projecting downwardly therefrom. A reversible motor 76 is mounted on the outer frame 29 and its shaft is connected to a train of gears in a gear box 45. The other end of the train of gears is connected by a shaft 46 to a worm 47 which meshes with the gear sector 44. Thus, it will be seen that when the motor 76 is energized it causes the rotation of the inner frame assembly about the axis of the shafts 43 and 54 relative to the frame 29.

In order to rotate the outer frame 29 about the "pitch" axis the stub shaft 31 is provided with an upwardly extending gear sector 33 similar to the gear sector 44 previously described, which is keyed to the shaft. Mounted on the upper crab ring 22 is a reversible electric motor 34 and a gear box 35 in which is housed a reduction gear train. The motor shaft is connected to one end of the aforementioned gear train. A worm gear shaft connected to the other end of the gear train projects from the gear box and carries a worm gear 36. The worm gear 36 meshes with the gear sector 33 whereby to rotate the latter about the axis of the stub shaft 31. Since the motor 34 is mounted on the crab ring 22 and geared to the outer frame 29 through the shaft 31, the frame may be pivoted in either direction by operating the reversible motor in one direction or the other.

The primary controls for the motors 34 and 76 which level the camera frame 52 are mounted in the control box 75. The controls comprise four photo-electric assemblies 57, 58, 59 and 60, each of which consists of a photoelectric element which is here shown as a phototube designated by the letter $a$, an exciter lamp $b$ and a level tube $c$. The individual elements of each photo-tube assembly, when mentioned specifically hereinafter, will be designated by the number of the assembly and the letter of the element, as phototube 57$a$, exciter lamp 57$b$, etc.

The phototubes may be of any well known type. The exciter lamps are small incandescent lamps which emit a beam of light that is focused on the adjacent phototube. The level tubes are glass tubes partially filled with liquid so as to provide a small level indicating bubble of air or other gas which is centered in the tube when the latter is level. Preferably either the gas or the liquid is opaque. The members of each assembly are arranged in substantial alignment, with each level tube interposed between the associated phototube and exciter lamp. Also, the level tubes are so arranged that a line between a phototube and its corresponding exciter lamp is adjacent one end of the interposed level tube.

The phototube assemblies 57 and 58 control the roll motor 76. The level tubes 57$c$ and 58$c$ of those assemblies are arranged in alignment and perpendicular to the roll axis. The level tubes 59$c$ and 60$c$ in the assemblies 59 and 60 are arranged in alignment and perpendicular to the pitch axis. The phototube assemblies 59 and 60 control the pitch motor 34.

Although the phototubes, exciter lamps and level tubes have been shown diagrammatically in Figure 1 as placed on top of the control box 75, as a matter of practice they will be mounted within the control box where they are protected from damage. They have been shown as they are merely to diagrammatically illustrate their arrangement and operation.

As above mentioned, the bubbles in the level tubes $c$ are centered when the tubes are level, and in that position the level bubbles are out of the path of the beams of light emanating from the corresponding exciter lamps. Thus, when the device is level the opaque fluid in the level tubes blocks the beams of light from all of the phototubes. However, when the inner frame tilts, at least one of the bubbles will move relative to the path of the corresponding beam of light and permit the light beam to strike the phototube upon which it is focussed.

The level tubes $c$ are so designed and arranged that the level bubbles can move out of their corresponding light beams in but one direction. In other words, as above mentioned, when the inner frame is level the bubbles will be centered in the level tubes and out of the light beams, and will move into the path of the latter only when the inner frame starts to tilt. When the bubbles do move into the light beams, the former are at or near the ends of the tubes, and even though the inner frame continues momentarily to tilt in the same direction the bubbles cannot move on beyond the corresponding light beams.

Figure 7:
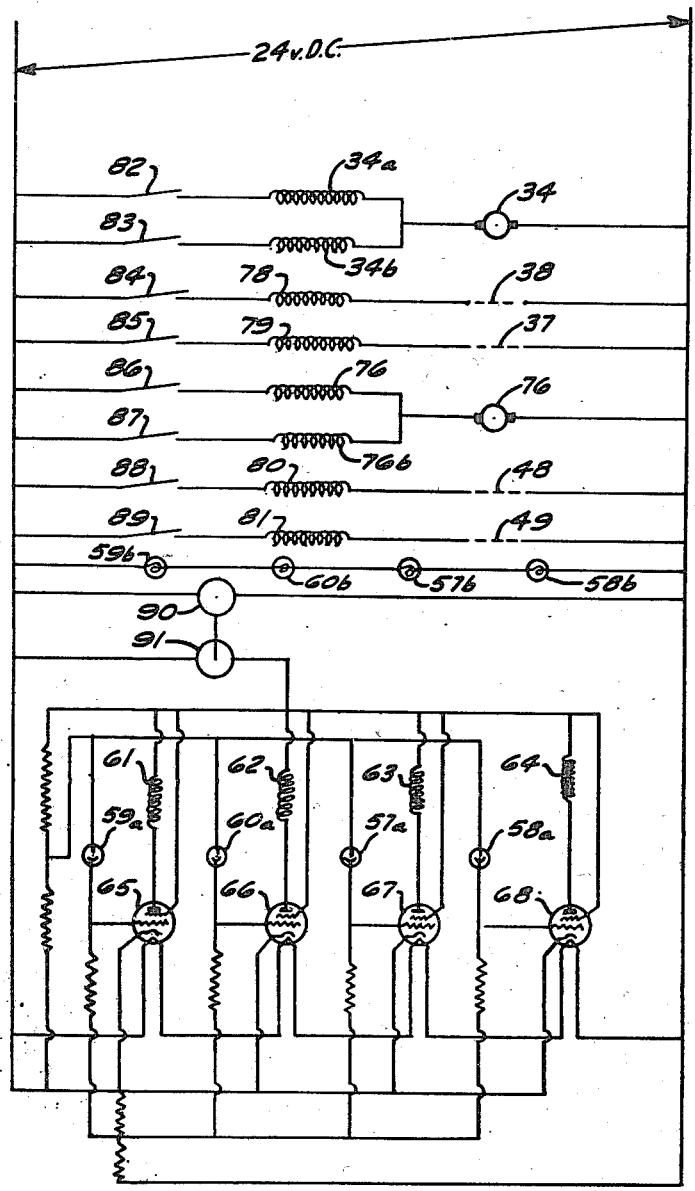
Figure 7 is an across the line wiring diagram of the electrical circuits for the pitch and roll motors and their controls.

The controls for the "pitch" and "roll" motors themselves are connected as shown in the wiring diagram of Figure 7. The line voltage is preferably 24 volts, and the motors 34 and 76 are designed to operate on that voltage. The motors 34 and 76 are reversible, and for that purpose are provided with two field coils 34a, 34b, and 76a and 76b respectively. In the circuits of the respective field coils are switches 82, 83, 86 and 87.

The switches 82, 83, 86 and 87 are mechanically connected to electromagnetic relays 78, 79, 80 and 81 in any conventional manner, so that when any relay coil is energized the corresponding switch is closed. The relays 78 and 79, which are the "pitch" motor relays, operate the switches 82 and 83 respectively. The "roll" motor relays 80 and 81 operate the switches 86 and 87 respectively. These relays are energized by the closing of the switches 84, 85, 88 and 89 which are in the relay circuits as shown.

The apparatus for actuating the switches 84, 85, 88 and 89 comprises four electromagnetic relays, of which relays 61 and 62 are the "pitch" relays, and relays 63 and 64 are the "roll" relays. The coils of these relays are connected into the respective plate circuits of four amplifier tubes 65, 66, 67 and 68. The photo-electric tubes 59a, 60a, 57a and 58a are located in the grid circuits of the respective tubes as shown in the diagram.

The exciter lamps 57b, 58b, 59b and 60b are connected in series across the line.

A converter comprising a 24 volt motor 90 and a generator 91 is provided for furnishing the necessary high plate voltage for the amplifier tubes. The generator 91 is connected to the plate circuits of the amplifier tubes, while the motor 90 is connected to the line.

Whenever the inner frame assembly carrying the camera 70 is level, the light beams from all four exciter lamps are blocked by the opaque fluid in the level tubes. Hence the phototubes are not energized, and all of the switches numbered 82 to 89 are open. If the inner frame assembly tilts, one or both of the motors 34 and 76 will be operated to return the inner frame assembly to a horizontal position.

For instance, if the airplane carrying the camera mount rolls about its longitudinal axis so that the right hand side (Figure 1) of the mount moves downwardly, the bubbles in the level tubes 57c and 58c will move to the left, permitting light from exciter lamp 57b to strike phototube 57a. Light from lamp 58b cannot strike phototube 58a because the bubble in the level tube 58c moves in the wrong direction. As soon as light hits the phototube 57a the latter will be energized and will permit an increase in the plate current in amplifier tube 67 to energize the roll relay 63. Since the relay 63 is mechanically coupled to switch 88 it will close the latter and energize the coil of the roll motor relay 80. The roll motor relay 80 will then close the switch 86 and energize the field 76a of the roll motor 76 to start the latter in the proper direction to return the inner frame assembly to a horizontal position. As soon as the horizontal position is reached the bubble in the level tube 57c will move out of the light beam, whereupon switches 88 and 86 will open to stop the motor.

The other field 76b of the motor 76 will be energized in the same way if the inner frame assembly tilts in the opposite direction. Pitch motor 34 is operated in a like manner by phototube assemblies 59a and 60a.

In order to limit the movement of the inner frame assembly about the "pitch" and "roll" axes, and thereby prevent damage to the apparatus, limit switches 37, 38, 48 and 49 are provided. The two limit switches 37 and 38 are connected in series with the "pitch" motor relays 78 and 79. The switches 37 and 38 are mounted on the crab ring 22 on opposite sides of the pivot shaft 30 and cooperate with projections 37a and 38a respectively mounted on the outer frame 29 whereby upon a predetermined relative movement of the frame 29 and crab ring 22 one of the other of the switches will be opened to de-energize the corresponding "pitch" motor relay and shut off the motor 34.

The switches 48 and 49 are connected in series with the "roll" motor relays 80 and 81 and operate in a similar manner with respect to "roll" motor 76. The switches 48 and 49 are mounted upon the outer frame 29 on opposite sides of the shaft 43 and cooperate with projections 48a and 49a on the cradle 40. Projections 48a open the switch 48 upon a predetermined relative rotation of the frame 29 and the cradle 40 in one direction, while projection 49a opens switch 49 upon relative rotation in the other direction.

From the foregoing it will be seen that the camera mount described constitutes a device for automatically maintaining a camera in a substantially level position at all times, regardless of movement of its support. If the pitch or roll of the plane exceeds a certain angle which might cause damage to the apparatus, the limit switches 37, 38, 48 and 49 stop the rotation of the motors and leave the parts in the positions they have assumed until the airplane returns to a position more nearly level.

It will be apparent that the invention described herein has a number of uses. It provides entirely automatic means for maintaining a camera or similar device in a substantially level position. A very slight tilting of the camera will be permitted, of course, but that will be immediately counteracted by the proper motor to return it to a level position. The device will not overrun, however. That is, when the camera is returned to a level position after tilting slightly, it will not tilt in the opposite direction due to its own inertia.

The scope of the invention is indicated in the appended claims.

I claim:

1. In combination: a supporting member; a first frame member pivotally mounted on said supporting member for pivotal movement relative thereto about a non-vertical axis; a second frame member pivotally mounted on said first frame member for pivotal movement about a non-vertical axis perpendicular to the first mentioned axis; and means for maintaining said second frame member in substantially a predetermined position relative to the horizontal comprising a first motor mounted upon one of said two first named members and connected to the other for causing relative rotation thereof about the pivot axis of the first frame member, a second motor mounted upon one of said frame members and connected to the other for causing relative rotation thereof about the pivot axis of the second frame member, and control mechanism for each of said motors arranged to cause operation of said motors only when said second frame member is in a position other than said predetermined position to return said second frame member to said predetermined position, said control mechanism including a level indicating device associated with said second motor and mounted on said second frame member for limited movement normal to the pivot axis of the said second frame member, and another level indicating device associated with said first motor and mounted on one of said frame members for limited movement normal to the pivot axis of said first frame member.

2. In combination: a supporting member; a first frame member pivotally mounted on said supporting member for pivotal movement relative thereto about a non-vertical axis; a second frame member pivotally mounted on said first frame member for pivotal movement about a non-vertical axis perpendicular to the first mentioned axis; and means for maintaining said second frame member in substantially a predetermined position relative to the horizontal comprising a first motor mounted upon one of said two first named members and connected to the other for causing relative rotation thereof about the pivot axis of the first frame member, a second motor mounted upon one of said frame members and connected to the other for causing relative rotation thereof about the pivot axis of the second frame member, and control mechanism for each of said motors arranged to cause operation of said motors only when said second frame member is in a position other than said predetermined position to return said second frame member to said predetermined position, said control mechanism including a photo-electric element for each of said motors arranged to actuate the corresponding motor when said element is energized, an exciter lamp for each of said photo-electric elements emitting a beam of light toward the corresponding element to energize the same, and a level indicating device associated with said second motor and mounted on said second frame member for limited movement normal to the pivot axis of the second frame member, and another level indicating device associated with said first motor and mounted on one of said frame members for limited movement normal to the pivot axis of the first frame member, said level indicating devices being interposed between the photo-electric elements and the exciter lamps for the corresponding motors whereby the light beam from each exciter lamp is interrupted by the associated level indicating means in at least one of the relative positions of the latter.

3. The combination defined in claim 2 wherein each of said level indicating means comprises a level tube containing a liquid fluid and a gaseous fluid, one of said fluids being opaque and the other fluid being transparent, said opaque fluid being adapted to interrupt the beam of light from the corresponding exciter lamp in one of the positions of the opaque fluid.

4. A support, a gimbal carried in said support, a member carried by said gimbal, means for maintaining said member in a fixed relation to the horizontal comprising motor means adapted to rotate said member about both axes of said gimbal, and level responsive gravity actuated pick-up means in control of said motor means, said level responsive means being carried by said gimbal.

5. In a leveling device, in combination, a first member which is subject to inclinations from a normal position, a second member pivoted in said first member on a first axis, a third member pivoted in said second member on an axis substantially at right angles to said first axis, reversible motor means for angularly positioning said second member with respect to said first member and for angularly positioning said third member with respect to said second member, and gravity influenced motor control means acting to cause said motor means to maintain said third member in a fixed angular relation with respect to horizontal.

6. In an aerial camera mount, in combination, a first member adapted to be secured to the interior of an airplane, said first member including a normally horizontal supporting track of arcuate form, a camera supporting member rotatable on said track about a normally vertical axis, reversible motor means for causing relative rotation between said camera supporting member and said track, manual control means for said motor means to determine the horizontal angular relationship between said first member and said camera supporting member, and means associated with said manual control means for indicating such angular relationship.

7. A support, a gimbal pivoted in said support, a member pivoted in said gimbal, means for maintaining said member in a fixed relation to the horizontal including motor means adapted to cause rotation of said member about mutually perpendicular normally horizontal axes of said gimbal, and gravity influenced level responsive means in control of said motor means, said level responsive means being actuated by gravity upon deviation of said member from the horizontal.

8. In combination, a member having an axis which it is desired to maintain in such position that if extended it always passes through the center of the earth, a movable support, means mounting said member on said support for movement about a pair of axes normally perpendicular to said first axis whereby said first axis may be moved to its desired position irrespective of the movement of said movable support, means including electro-motor means energisable to cause movement of said member about said pair of axes, and switch means in control of said electro-motor means and associated with said member, said switch means assuming an operative position upon relatively small movement of said member out of its desired position and assuming an inoperative position when said member is either in its desired position or upon large movement of said member out of its desired position.

9. In a leveling device, in combination, supporting means, a first member carried by said supporting means for rotation about a normally vertical axis, first reversible motor means engaging said first member at a point removed from said axis, and adapted to move said first member with respect to said supporting means, a second member carried by said first member for rotation about a second axis substantially at right angles to said vertical axis, second reversible motor means carried on said first member for angularly adjusting said second member with respect to said first member, a third member pivoted in said second member on a third axis substantially at right angles to both said vertical and second axes, third reversible motor means carried on said second member for varying the angular relation between said third and said second members, and gravity influenced motor control means in control of said second and third motor means for operating said second and third motor means on inclination of said normally vertical axis to maintain said third member in a fixed relation with respect to horizontal.

MILFORD B. MOORE.

REFERENCES CITED

The following references are of record in the file of this patent:

UNITED STATES PATENTS

| Number | Name | Date |
|---|---|---|
| 1,016,240 | Alexieff | Jan. 30, 1912 |
| 1,559,688 | Fairchild et al. | Nov. 3, 1925 |
| 1,747,664 | Droitcour | Feb. 18, 1930 |
| 1,818,103 | Sperry | Aug. 11, 1931 |
| 1,873,579 | Haas | Aug. 23, 1932 |
| 1,942,604 | Kennedy | Jan. 9, 1934 |
| 1,999,646 | Wittkuhns | Apr. 30, 1935 |
| 2,100,934 | Burges | Nov. 30, 1937 |
| 2,252,727 | Pepper | Aug. 19, 1941 |

FOREIGN PATENTS

| Number | Country | Date |
|---|---|---|
| 516,185 | Great Britain | Dec. 27, 1939 |
| 285,715 | Germany | Jan. 12, 1927 |
| 439,227 | Germany | Jan. 12, 1927 |